United States Patent Office 3,520,894
Patented July 21, 1970

3,520,894
1-(CYCLOHEX - 2' - EN-4'-ONE)-2-PHENYL-1,2,3,4-TETRAHYDRONAPHTHALENE DERIVATIVES
Alexander D. Cross, Mexico City, Mexico, assignor to Syntex Corporation, Panama, Panama, a corporation of Panama
No Drawing. Filed Aug. 22, 1966, Ser. No. 573,834
Int. Cl. C07c 49/76
U.S. Cl. 260—294.7                               10 Claims

ABSTRACT OF THE DISCLOSURE

New compounds of the 1,2,3,4-tetrahydronaphthalene class, useful as estrogenic agents, and methods for their preparation. 1-[1'-methoxycyclohexa - 2',5'-dienyl-spiro-4' (2") - (4",4" - dimethyl - 5" - oxo - 1",3" - dioxolane)]-2 - (p - chlorophenyl) - 6 - methoxy - 1,2,3,4 - tetrahydronaphthalene and 1-(cyclohex-2'-en-4'-one)-2-(p-chlorophenylene) - 6 - (2'-dimethylaminoethoxy) - 1,2,3,4 - tetrahydronaphthalene are exemplified as illustrative of the class.

This invention relates to novel tetrahydronaphthalenes derivatives.

More particularly, the present invention relates to novel 1,2,3,4-tetrahydronaphthalene derivatives of the following formulas

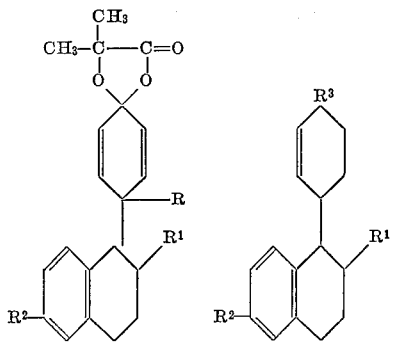

wherein R is a lower alkoxy, R¹ is selected from the group consisting of phenyl, chlorophenyl, fluorophenyl, lower alkylphenyl, and lower alkoxyphenyl, and R² is selected from the group consisting of hydrogen, lower alkoxy, lower-2-dialkylaminoethoxy, and 2-piperidinoethoxy, R³ is oxo, hydroxy, hydrocarbon carboxylic acyloxy group of less than 12 carbon atoms, tetrahydropyran-2-yloxy, or tetrahydrofuran-2-yloxy. The chloro, fluoro, lower alkyl and lower alkoxy substituent on the phenyl group can be in the para, ortho or meta position, preferably para.

The carboxylic acyl groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino halogeno, and the like. Typical esters thus include acetate, propionate, enanthate, benzoate, trimethylacetate, t - butylacetate, phenoxyacetate, cyclopentylpropionate, aminoacetate, β-chloropropionate, adamantoate, and the like.

The lower alkyl and lower alkoxy groups of the compounds of the present invention contain from 1 to about 6 carbon atoms. Typical groups include methyl, ethyl, n-propyl, n-butyl, isopropyl, n-pentyl, and the like and the corresponding oxy derivatives.

The novel compounds of the present invention are derived from a 1,2-diaryl tetrahydronaphthalene according to the following outlined process.

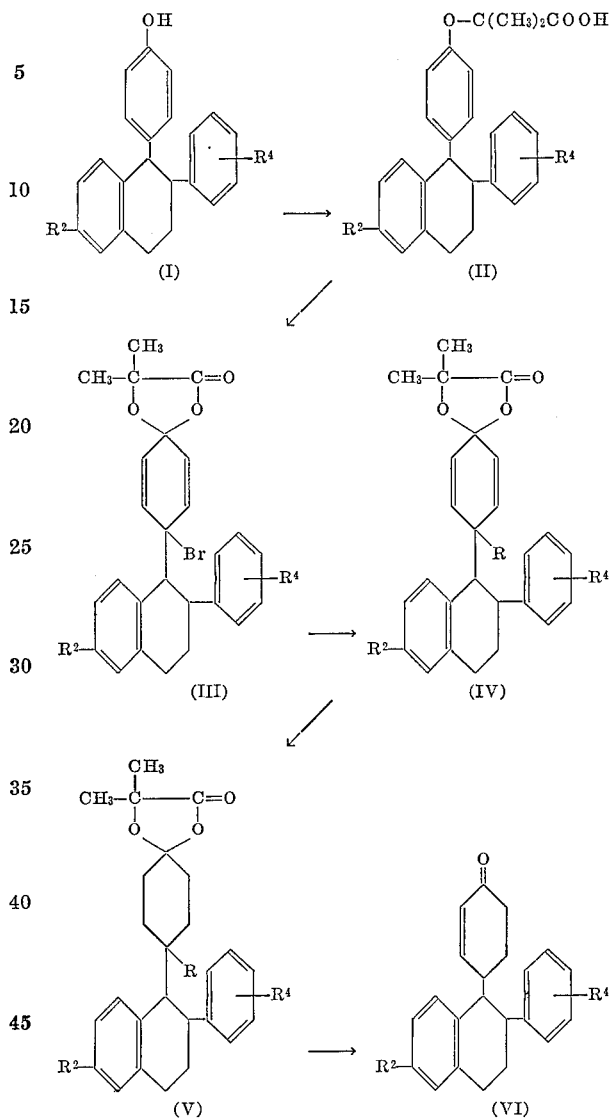

In the above formulas R and R² are as defined hereinabove and R⁴ is hydrogen, chloro, fluoro, lower alkyl, or lower alkoxy, preferably in the para position.

In practicing the above outlined process a 1,2-diaryltetrahydronaphthalene (I) is treated with chloroform and acetone in the presence of base as described in detail hereinafter to furnish the corresponding oxyisobutyric acid derivative II. The Compound II is then treated with potassium tribromide solution in the presence of a base furnishing the spiro or dioxolane Compound III which upon treatment with a monohydric alcohol, e.g., methanol, ethanol, propanol, and the like in the presence of silver nitrate furnishes the Compound IV. The compound of Formula IV is then subjected to hydrogenation using a palladium-on-charcoal catalyst to furnish the Compound V. The Compound V upon treatment with an aqueous acid, e.g., aqueous acetic, hydrochloric acid and the like furnishes the novel compounds of Formula VI.

The 1-(cyclohex-2'-en-4'-one)-2-(aryl)-1,2,3,4-tetrahydronaphthalene of Formula VI can then be treated with a reducing agent such as sodium borohydride, lithium aluminum hydride or the like in an organic solvent, e.g., methanol, tetrahydrofuran, or the like to furnish the corresponding hydroxy derivative. The hydroxy compound can then be esterified or etherified according to conventional procedures to obtain the corresponding ester or ether. Esters can be obtained by treatment of the compound with, for example, a carboxylic acid anhydride, hydrocarbon carboxylic acid halide, e.g., the chloride, or the like in an organic solvent, e.g., pyridine. Ethers can be obtained by, e.g., reacting the free hydroxy compound with sodium hydride in an inert solvent, e.g., dimethyl diethylene glycol ether, followed by treatment with 2-chloro-tetrahydropyran or 2-chlorotetrahydrofuran to obtain the tetrahydropyran-2-yl ether and tetrahydrofuran-2-yl ether, respectively.

The presence of asymmetric carbon atoms in the compounds of the present invention permits the existence of optical isomers. The optical isomers are encompassed by the present invention.

The novel compounds of the present invention and mixtures thereof possess valuable physiological properties. They are useful as estrogenic agents in the same manner as known steroidal estrogens such as estradiol, e.g., in veterinary medicine for the control and regulation of fertility. They can be administered in conjunction with pharmaceutically acceptable excipients in the same manner and at the same dosage level, or lower, used heretofore for known steroidal estrogenic agents.

The following detailed examples are provided to illustrate the present invention.

EXAMPLE 1

Eight grams of 1-(p-hydroxyphenyl)-2-(p-chlorophenyl)-6-methoxy-1,2,3,4-tetrahydronaphthalene, 6.4 g. of powdered sodium hydroxide, and 120 ml. of acetone are stirred together in ice and then a solution of 5 g. of chloroform in 25 ml. of acetone is added over a period of 30 minutes. The resulting mixture is then stirred in ice for an hour, allowed to stand at room temperature for about one hour and then refluxed for 4 hours. After refluxing, the mixture is poured into 800 ml. of water, stirred with activated charcoal, filtered and the thus-obtained filtrate extracted with ether and separated. The aqueous phase is covered with ether, adjusted to pH 3 by the addition of 85% phosphoric acid and extracted with several portions of ether. The ether extracts are combined, washed with water and then with 1% sodium bicarbonate solution and finally with 1% sodium hydroxide. The latter alkaline solution is acidified by the addition of 85% phosphoric acid and extracted with ether. The organic extracts are washed to neutrality with water and evaporated in vacuo to give 1-(p-isobutyric acid oxyphenyl)-2-(p-chlorophenyl)-6-methoxy-1,2,3,4 - tetrahydronaphthalene.

To an ice-cold suspension of 500 mg. of the foregoing compound in 25 ml. of dimethyl sulfoxide, 25 ml. of water and 1.25 g. of potassium bicarbonate there is added dropwise with stirring 0.9 ml. of potassium tribromide solution prepared by mixing 8 g. of bromine and 12 g. of potassium bromide in 30 ml. of water. The reaction mixture is then poured into water and extracted with ether. This extract is washed with sodium bicarbonate, water, dried over sodium sulfate and evaporated in vacuo at 30–40° to afford 1-[1'-bromo-cyclohexa-2',5'-dienyl-spiro-4'(2'')-(4'',4''-dimethyl-5''-oxo-1'',3''-dioxolane)] - 2-(p-chlorophenyl)-6-methoxy-1,2,3,4 - tetrahydronaphthalene.

Two hundred fifty milligrams of the above compound is treated with methanol (−20°) to dissolve the bromo compound and filtered by suction immediately into a solution of 3 moles of silver nitrate in 25 ml. of methanol (−50°), with stirring. The mixture is allowed to warm to room temperature within 0.5 hour. Solid potassium acetate (1 g.) is then added and the solid material is filtered off after 3 minutes. The solvent is removed in vacuo and the residue taken up in water and extracted with ether. The ethereal solution is extracted with sodium bicarbonate solution, dried with magnesium sulfate and evaporated to give 1-[1'-methoxy-cyclohexa-2',5'-dienyl-spiro-4'(2'')-(4'',4''-dimethyl-5''-oxo-1'',3''-dioxolane)]-2-(p - chlorophenyl)-6-methoxy-1,2,3,4-tetrahydronaphthalene.

By repeating the process of this example using other 1-(p-hydroxyphenyl)-2-(aryl or substituted aryl)-1,2,3,4-tetrahydronaphthalenes, e.g., 1-(p-hydroxyphenyl)-2-(p-chlorophenyl)-1,2,3,4-tetrahydronaphthalene, 1 - (p - hydroxyphenyl)-2-phenyl-1,2,3,4-tetrahydronaphthalene, 1-(p-hydroxyphenyl)-2-(p-fluorophenyl)-6-methoxy - 1,2,3,4-tetrahydronaphthalene, 1-(p-hydroxyphenyl)-2-(p-chlorophenyl)-6-(2'-dimethylaminoethoxy)-1,2,3,4 - tetrahydronaphthalene, 1-(p-hydroxyphenyl)-2-(p - chlorophenyl)-6-(2'-piperidinoethoxy) - 1,2,3,4 - tetrahydronaphthalene, and the like in place of 1-(p-hydroxyphenyl)-2-(p-chlorophenyl)-6-methoxy-1,2,3,4 - tetrahydronaphthalene as the starting material, the corresponding 1-[1'-methoxy-cyclohexa-2',5'-dienyl-spiro-4(2'')-(4'-4'' - dimethyl - 5''-oxo-1'',3''-dioxolane)]-derivatives are obtained.

Similarly, by using other monohydric lower alcohols, e.g., ethanol, n-propanol, and the like, in place of methanol in the last step of the process of this example, the corresponding 1'-alkoxy derivatives are obtained, e.g., 1'-ethoxy, 1'-propoxy, and the like.

EXAMPLE 2

A suspension of 0.5 g. of 5% palladium-on-carbon catalyst in 50 ml. of methanol is hydrogenated for 30 minutes. A solution of 2 g. of 1-[1'-methoxy-cyclohexa-2',5'-dienyl-spiro-4'(2'')-(4'',4''-dimethyl - 5'' - oxo - 1'',3''-dioxolane)] - 2 - (p - chlorophenyl) - 6 - methoxy-1,2,3,4-tetrahydronaphthalene in 200 ml. of methanol is added and hydrogenated with agitation until the uptake of hydrogen has ceased. The catalyst is removed by filtration and the solution is evaporated to yield 1-[1'-methoxycyclohexylspiro-4'(2'')-(4'',4''-dimethyl - 5'' - oxo-1'',3''-dioxolane)]-2-(p-chlorophenyl)-6-methoxy - 1,2,3,4 - tetrahydronaphthalene.

0.5 gram of the above compound in 20 ml. of 80% acetic acid is heated at steam bath temperatures for one hour. The mixture is cooled, diluted with water and filtered. The solid which forms is collected by filtration to furnish 1 - (cyclohex-2'-en-4'-one)-2-(p-chlorophenyl)-6-methoxy-1,2,3,4-tetrahydronaphthalene.

By repeating the process of this example using in place of 1-[1'-methoxy-cyclohexa-2',5'-dienyl-spiro-4'(2'')-(4'',4''-dimethyl-5''-oxo-1'',3''-dioxolane)] - 2 - (p - chlorophenyl)-6-methoxy-1,2,3,4 - tetrahydronaphthalene as the starting material, the other spiro compounds obtained in Example 1, the corresponding 1-(cyclohex-2'-en-4'-one)-2-(aryl or substituted aryl)-tetrahydronaphthalenes are obtained, e.g., 1-(cyclohex - 2' - en - 4' - one)-2-(p-chlorophenyl) - 1,2,3,4-tetrahydronaphthalene, 1-(cyclohex-2'-en-4'-one)-2 - phenyl - 1,2,3,4-tetrahydronaphthalene, 1 - (cyclohex - 2' - en-4'-one)-2-(p-fluorophenyl)-6-methoxy-1,2,3,4-tetrahydronaphthalene, 1 - (cyclohex - 2' - en - 4'-one) - 2 - (p-chlorophenyl)-6-(2'-dimethylamino-ethoxy)-1,2,3,4 - tetrahydronaphthalene, 1-(cyclohex-2' - en - 4'-one)-2-(p-chlorophenyl)-6-(2'-piperidinoethoxy) - 1,2,3,4-tetrahydronaphthalene, 1-(cyclohex-2'-en-4'-one) - 2 - (p-methylphenyl) - 6 - methoxy - 1,2,3,4-tetrahydronaphthalene, and the like.

500 mg. of 1-(cyclohex - 2' - en - 4' - one)-2-(p-chlorophenyl)-6-(2'-dimethylaminoethoxy)-1,2,3,4 - tetrahydronaphthalene is dissolved in ether and an equimolar amount of citric acid in ether is added to the solution, then the product formed is collected and dried to furnish the citrate of 1-(cyclohex - 2' - en - 4' - one)-2-(p-chlorophenyl)-6-(2'-dimethylaminoethoxy)-1,2,3,4 - tetrahydronaphthalene.

Through the use of other pharmaceutically acceptable inorganic and organic acids in place of citric acid in the above procedure, the corresponding acid addition salt can be obtained.

EXAMPLE 3

A solution of 1 g. of sodium borohydride in 3 ml. of water is added to an ice-cooled solution of 1 g. of 1-(cyclohex-2′-en-4′-one)-2-(p-chlorophenyl) - 6 -methoxy-1,2,3,4-tetrahydronaphthalene in 120 ml. of methanol and the mixture is then allowed to stand at room temperature for 16 hours. The excess reagent is decomposed by the addition of acetic acid and the solution is then concentrated to small volume in vacuo and diluted with water. The product is extracted with ethyl acetate and these extracts are washed with water, dried and evaporated to dryness to yield 1-(cyclohex-2′-en-4′-ol)-2-(p-chlorophenyl)-6-methoxy-1,2,3,4-tetrahydronaphthalene.

EXAMPLE 4

A mixture of 1 g. of 1-(cyclohex-2′-en-4′-ol)-2-(p-chlorophenyl) - 6 - methoxy - 1,2,3,4 - tetrahydronaphthalene, 4 ml. of pyridine and 2 ml. of acetic anhydride is allowed to stand at room temperature for 15 hours. The mixture is then poured into ice water and the product collected by filtration and washed to furnish 1(4′-acetoxy-cyclohex-2′-ene)-2-(p-chlorophenyl)-6-methoxy - 1,2,3,4-tetrahydronaphthalene.

EXAMPLE 5

To a slurry of 1.0 g. of sodium hydride in 10 ml. of dry diethyleneglycol dimethyl ether under a dry nitrogen atmosphere is slowly added 1.0 g. of 1-(cyclohex-2′-en-4′-ol)-2-(p-chlorophenyl) - 6 - methoxy - 1,2,3,4 - tetrahydronaphthalene in 10 ml. of dry diethyleneglycol dimethyl ether in a dropwise fashion over a 20 minute period. To this mixture is added dropwise, 0.9 g. of 2-chlorotetrahydrofuran over a 10 minute period.

The mixture is stirred at room temperature for an additional 30 minutes and then cautiously added to an ice-water mixture with stirring. The organic phase is extracted with diethyl ether, dried and evaporated under reduced pressure to yield 1 - [4′ - (tetrahydrofuran - 2′-yloxy)-cyclohex-2′-ene]-(p-chlorophenyl) - 6 - methoxy-1,2,3,4-tetrahydronaphthalene.

By substituting 2-chlorotetrahydropyran for 2-chlorotetrahydrofuran in the process of this example, the corresponding tetrahydropyran-2-yl ether is obtained.

EXAMPLE 6

Eight grams of 1β - (p - hydroxyphenyl)-2α-(p-chlorophenyl)-6-methoxy-1,2,3,4-tetrahydronaphthalene, 6.4 g. of powdered sodium hydroxide, and 120 ml. of acetone are stirred together in ice and then a solution of 5 g. of chloroform in 25 ml. of acetone is added over a period of 30 minutes. The resulting mixture is then stirred in ice for an hour, allowed to stand at room temperature for about one hour and then refluxed for 4 hours. After refluxing, the mixture is poured in 800 ml. of water, stirred with activated charcoal, filtered and the thus-obtained filtrate extracted with ether and separated. The aqueous phase is covered with ether, adjusted to pH 3 by the addition of 85% phosphoric acid and extracted with several portions of ether. The ether extracts are combined, washed with water and then with 1% sodium bicarbonate solution and finally with 1% sodium hydroxide. The latter alkaline solution is acidified by the addition of 85% phosphoric acid and extracted with ether. The organic extracts are washed to neutrality with water and evaporated in vacuo to give 1β-(p-isobutyric acid oxyphenyl)-2α-(p-chlorophenyl) - 6 - methoxy - 1,2,3,4 - tetrahydronaphthalene.

To an ice-cold suspension of 500 mg. of the foregoing compound in 25 ml. of dimethyl sulfoxide, 25 ml. of water and 1.25 g. of potassium bicarbonate, there is added dropwise with stirring 0.9 ml. of potassium tribromide solution prepared by mixing 8 g. of bromine and 12 g. of potassium bromide in 30 ml. of water. After the bromide solution is added, the reaction mixture is then poured into water and extracted with ether. The ether extract is washed with sodium bicarbonate, water, dried over sodium sulfate and evaporated in vacuo at about 30–40° C. to afford 1β - [1′ - bromo-cyclohexa-2′,5′-dienyl-spiro-4′-(2″)-(4″,4″-dimethyl - 5″ - oxo - 1″,3″ - dioxolane)]-2α-(p-chlorophenyl) - 6 - methoxy - 1,2,3,4 - tetrahydronaphthalene.

250 mg. of the above compound is dissolved in methanol (−20° C.) and then filtered by suction immediately into a solution of 3 mmoles of silver nitrate in 25 ml. of methanol (−50° C.) with stirring. The mixture is allowed to warm to room temperature. Solid potassium acetate (1 g.) is then added and the solid material is filtered off after about 3 minutes. The solvent is removed in vacuo and the residue taken up in water and extracted with ether. The ethereal solution is extracted with sodium bicarbonate solution, dried with magnesium sulfate and evaporated to give 1β-[1′-methoxy-cyclohexa-2′,5′-dienyl-spiro-4′-(2″) - (4″,4″ - dimethyl-5″-oxo-1″,3″ - dioxolane)] - 2α - (p-chlorophenyl)-6-methoxy-1,2,3,4-tetrahydronaphthalene.

EXAMPLE 7

A suspension of 0.5 g. of 5% palladium-on-carbon catalyst in 50 ml. of methanol is hydrogenated for 30 minutes. A solution of 2 g. of 1β-[1′-methoxy-cyclohexa-2′,5′-dienyl-spiro-4′(2″) - (4″,4″-dimethyl-5″-oxo-1″,3″-dioxolane)] - 2α - (p-chlorophenyl)-6-methoxy-1,2,3,4-tetrahydronaphthalene in 200 ml. of methanol is added and hydrogenated with agitation until the uptake of hydrogen has ceased. The catalyst is removed by filtration and the solution is evaporated to yield 1β-[1′-methoxy-cyclohexyl-spiro-4′(2″) - (4″,4″-dimethyl-5″-oxo-1″,3″-dioxolane)] - 2β - (p-chlorophenyl)-6-methoxy-1,2,3,4-tetrahydronaphthalene.

0.5 gram of the above compound in 20 ml. of 80% acetic acid is heated at steam bath temperatures for one hour. The mixture is cooled, diluted with water and filtered. The product is collected and washed to furnish 1β-(cyclohex-2′-en-4′-one)-2β - (p-chlorophenyl)-6-methoxy-1,2,3,4-tetrahydronaphthalene.

I claim:

1. A compound selected from the group consisting of:

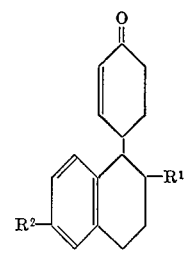

wherein R¹ is selected from the group consisting of phenyl, chlorophenyl, fluorophenyl, lower alkylphenyl, and lower alkoxyphenyl, and R² is selected from the group consisting of hydrogen, lower alkoxy, lower dialkylaminoethoxy, and piperidinoethoxy.

2. A compound according to claim 1 wherein R¹ is p-chlorophenyl and R² is methoxy.

3. A compound according to claim 1 wherein R¹ is p-fluorophenyl and R² is methoxy.

4. A compound according to claim 1 wherein R¹ is p-methyphenyl and R² is methoxy.

5. A compound according to claim 1 wherein $R^1$ is p-chlorophenyl and $R^2$ is dimethylaminoethoxy.

6. A compound according to claim 1 wherein $R^1$ is p-fluorophenyl and $R^2$ is dimethylaminoethoxy.

7. A compound according to claim 1 wherein $R^1$ is p-methylphenyl and $R^2$ is dimethylaminoethoxy.

8. A compound according to claim 1 wherein $R^1$ is p-chlorophenyl and $R^2$ is piperidinoethoxy.

9. A compound according to claim 1 wherein $R^1$ is p-fluorophenyl and $R^2$ is piperidinoethoxy.

10. A compound according to claim 1 wherein $R^1$ is p-methylphenyl and $R^2$ is piperidinoethoxy.

References Cited

UNITED STATES PATENTS 3,422,114   1/1969   Huebner et al. _____ 260—570.7

HENRY R. JILES, Primary Examiner

S. D. WINTERS, Assistant Examiner

U.S. Cl. X.R.

260—294, 519, 520, 619, 294.3, 345.9, 347.7, 347.8, 340.2, 570.7, 590, 613, 618, 488, 476, 473, 468, 482, 487, 999